United States Patent Office 2,738,100
Patented Mar. 13, 1956

2,738,100

PLASTICIZATION OF SULFUR VULCANIZABLE MATERIALS, AND RELATED COMPOSITIONS

Walter A. Schulze and John C. Hillyer, Bartlesville, Okla., assignors to Phillips Petroleum Company, a corporation of Delaware No Drawing. Application January 2, 1951,
Serial No. 204,066

26 Claims. (Cl. 220—63)

This invention relates to the plasticization of sulfur-vulcanizable organic plastic substances containing unsaturated carbon-to-carbon bonds, and to associated plasticizer-containing materials. In one embodiment this invention relates to a method for plasticizing natural and synthetic rubbers. In another embodiment this invention relates to new compositions comprising natural and synthetic rubbers, each incorporated with one or more selected derivatives of a liquid polymer of a diene containing from 4 to 6 carbon atoms in a molecule.

Various types of materials have been employed as softeners or plasticizers for both natural and synthetic rubbers and it is known that variations in properties of rubber products can be produced through the use of different plasticizing agents. A good plasticizer, in addition to softening a rubber stock, must give a finished product with other desirable properties. Some materials which exert the desired plasticizing action often have deleterious effects on other properties to the extent that the finished products are of little value for many purposes. One of the disadvantages of some synthetic elastomers is that they do not possess sufficient tack. A plasticizer which gives a product of improved tack as well as other good physical properties is highly desirable.

We have now discovered novel softeners which by their incorporation with rubber stocks, by which we mean to include natural rubber, synthetic rubber and reclaimed rubber, are good rubber plasticizers and tackifiers and also impart other desirable properties to the rubber. These materials are applicable in compounding natural and synthetic rubbers, and reclaimed rubber, and they can be used alone as softeners and tackifiers in a compounding recipe or as mixtures with each other or in conjunction with other softeners. They are effective not only as plasticizers and tackifiers but the rubber in which they are used shows particularly good aged flex life and tensile strength. These novel softeners have especial utility as plasticizers of rubbers of the Perbunan type, i. e., butadiene-acrylonitrile copolymers, since they form rubber compositions having particularly low extractability characteristics. Rubber compositions having these properties are of especial value as applied to the manufacture of articles which are used in contact with hydrocarbon solvents, such as gaskets, fuel tank linings and the like. The novel rubber softeners of our invention are those derivatives of a liquid polymer of a conjugated diene containing from 4 to 6 carbon atoms in the molecule, selected from the group consisting of a hydroxylated liquid polydiene, a neutral mixed phosphorus-containing ester of a hydroxylated liquid polydiene, and a monocarboxylic organic acid ester of a liquid hydroxylated polydiene.

An object of this invention is to provide a method for plasticizing a sulfur-vulcanizable organic plastic substance containing unsaturated carbon-to-carbon bonds. Another object is to provide new compositions each comprising a sulfur-vulcanizable organic plastic substance containing unsaturated carbon-to-carbon bonds, incorporated with one or more selected derivatives of a liquid polymer of a conjugated diene containing from 4 to 6 carbon atoms in a molecule. Another object is to provide selected vulcanizates as new compositions. Another object is to provide a method for plasticizing natural rubber. Another object is to provide a method for plasticizing synthetic rubber. Another object is to provide a method for plasticizing reclaimed rubber. Another object is to provide new compositions comprising natural, reclaimed, and synthetic rubbers, each incorporated with at least one derivative of a liquid polymer of a conjugated diene containing from 4 to 6 carbon atoms in the molecule, selected from the group consisting of a hydroxylated liquid polydiene, a neutral mixed phosphorus-containing ester of a hydroxylated polydiene, and a monocarboxylic organic acid ester of a hydroxylated polydiene. Another object is to provide improved softeners which impart desirable swelling and non-extractability characteristics to Perbunan rubbers. Other objects will be apparent to one skilled in the art from the accompanying disclosure and discussion.

In accordance with our invention we have provided a method for plasticizing sulfur-vulcanizable organic plastic substances containing unsaturated carbon-to-carbon bonds, and new compositions comprising such sulfur-vulcanizable organic materials incorporated with one or more novel plasticizing agents. Our invention is well applied to plasticization of natural rubber, reclaimed rubber and synthetic rubber. We have discovered that natural rubber, sulfur-vulcanizable synthetic rubber-like materials, or rubber substitutes, as for example butadiene-styrene copolymers, Perbunan, butyl, GR–I, neoprene, and the like, and reclaimed rubber, can be plasticized by the incorporation therewith of a liquid polydiene derivative as a novel plasticizing agent or softener material, selected from the group consisting of a hydroxylated liquid polydiene, a neutral mixed phosphorus-containing ester of a hydroxylated liquid polydiene, and a mono-carboxylic organic acid ester of a hydroxylated polydiene.

The plasticizing agents of our invention are derivatives of non-rubber-like liquid polydienes, free from dissolved or suspended solid polymers. The liquid polydiene from which our plasticizers are derived is not a rubber-like synthetic polymer, in any sense of the word, but rather it is a non-rubber- like liquid polymer free from solid polymers, having a molecular weight within the limits of 500 to 5000 (as determined by the freezing point lowering in benzene) and a viscosity within the limits of 100 and 6000 Saybolt Furol seconds at 100° F. The unsaturation of the liquid polydiene is geenrally within the limits of 0.7 and 0.9 double bond per diene unit, as determined by Lee, Kolthoff and Mairs, J. Polymer Science 3, No. 1, 66 (1948). These non-rubber-like polymers can be polymers of a conjugated diene alone, or copolymers of a diene with a minor proportion of a higher-boiling mono-olefin copolymerizable therewith and containing the groups, $CH_2=C<$, such as styrene, methyl substituted styrenes and the like. Suitable conjugated dienes from which these liquid polymer reactants can be made include primarily those having 4 to 6 carbon atoms per molecule, such as 1,3-butadiene, chloroprene, bromoprene, isoprene, dimethylbutadiene, and the like. Mixtures of the conjugated dienes may also be employed.

These liquid diene polymers can be produced by any suitable means, one of which involves solution polymerization of the diene in the presence of a finely divided alkali metal catalyst and a hydrocarbon solvent. In another method the liquid diene polymer can be prepared by aqueous emulsion polymerization in the presence of relatively large amounts of mercaptan modifiers, and in still another method it can be produced in the presence of hydrofluoric acid as a catalyst. One method of preparing the liquid polydiene by solution polymerization is disclosed in detail in the copending application, Serial No. 67,098, of W. W. Crouch, filed December 23, 1948, wherein is described the polymerization of a conjugated monomeric diene of about 90 per cent purity or higher in the presence of a finely divided alkali metal catalyst and diluent, at a temperature generally within the limits of 60 and 110° C. for a reaction time generally not exceeding 8 hours.

The hydroxylated liquid polydiene plasticizing materials of our invention can be prepared by any suitable method. One such preparative method is disclosed in the copending application of J. C. Hillyer and L. O. Edmonds, Serial No. 204,062, filed January 2, 1951. In accordance with that procedure, the liquid polydiene described above is reacted with hydrogen peroxide, in the presence or absence of a solvent, and in the presence of formic acid or a selected lower alkyl ester of formic acid as a catalyst, for a time of from about 1 to 60 hours, and at a temperature of about 50 to 200° F., to effect the desired hydroxylation. In this manner the liquid polymeric diene is reacted so that a portion of the double bonds therein are hydroxylated, two hydroxy groups being added to each double bond reacted. The hydroxylated material may undergo esterification in the presence of formic acid to give a final product which contains both hydroxy and formoxy groups. When ester-type catalysts such as methyl formate are employed instead of formic acid, the hydroxylated products are substantially unesterified. It is also within the scope of our invention to partially hydrogenate the liquid polydiene prior to hydroxylation, or if desired, to hydrogenate the product of hydroxylation of the unhydrogenated liquid polydiene, and to employ in either case the resulting hydroxylated liquid polydiene as a plasticizer as described herein.

The hydroxylated liquid polydiene materials which are applicable as rubber plasticizers and tackifiers in accordance with our invention are substantially completely soluble in acetone, have a hydroxyl number in the range from 100 to 400, and a saponification number in the range from 0 to 150. The hydroxyl number can be determined by refluxing a weighed sample of the hydroxylated liquid polydiene with a solution of acetic anhydride in pyridine, adding water, and titrating the excess acetic acid. The hydroxyl number is expressed as milligrams KOH per gram sample. The saponification number is expressed in the same terms and is a measure of the esterification.

The phosphorus-containing esters of liquid hydroxy polydienes employed as plasticizers in accordance with our invention are neutral mixed esters of two types, containing in their molecule one or the other, or both, of the following nuclei:

(1)

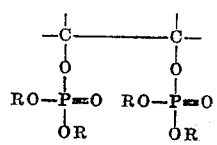

and (2)

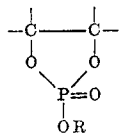

where R is an alkyl group containing from 1 to 8 carbon atoms. These ester compounds are formed by first interacting a hydroxylated liquid diene of the type described above with POCl₃ as an esterification agent to produce the acid ester, and then reacting the resulting compound with a low molecular weight aliphatic monohydric alcohol to esterify the remaining acid groups.

The amount of POCl₃ used in the first step of the esterification is usually expressed in terms of acid equivalents per equivalent of hydroxyl radical. In general 0.33 to 3 acid equivalents of phosphorus compound are employed per equivalent of hydroxyl radical in the hydroxypolydiene. The radio of acid equivalents to hydroxyl equivalents is a factor which must be considered in directing the process to the preparation of products of one type or the other; however, no matter which type is prepared, products varying in degree of esterification from 10 to 100 per cent of hydroxy groups in the hydroxypolydiene can be provided. Temperatures applicable for the first step of the process are in the range from 20 to 150° C. Reaction time usually does not exceed 72 hours. In the second step of the preparation of the mixed phosphorus-containing esters, the alcohol is used in sufficient quantity to react substantially completely with the unreacted acidic phosphorus-containing groups to yield neutral esters as final products. Alcohols which are applicable include compounds containing from one carbon atom up to those generally containing not more than eight carbon atoms. The temperature employed for this step of the esterification is usually in the range from −20 to 100° C. Reaction time will usually be in the range from one to 24 hours.

The products resulting from this preparative method, and illustrated in type formulas (1) and (2) above, are neutral phosphorus-containing esters of mixed character. In all probability both types of ester units are present in the final product with one type or the other, i. e., (1) or (2) above, predominating depending upon the various operating factors. The formation of one type of product or the other is dependent upon the factors previously discussed, i. e., ratio of reactants, temperature, time, and dilution.

In the preparation of these neutral mixed phosphorus-containing ester plasticizers, the hydroxylated liquid polydiene starting material can be partially hydrogenated prior to the esterification and such hydrogenation is frequently preferred. When esterifying the unhydrogenated hydroxypolydiene with the phosphorus esterification agent, a basic substance such as pyridine or its homologues, or N,N-dimethylaniline, can be included in the reaction mixture to react with the acid formed during the esterification, which acid if otherwise allowed to remain in the reaction mixture, would promote polymerization.

When carrying out such a hydrogenation it is generally preferred that an inert medium, which is a solvent for both the hydroxypolydiene and the hydrogenated product, be present. Suitable solvents include polyethers such as dioxane, dimethyl ether of ethylene glycol, and dimethyl ether of diethylene glycol and alcohols. It is desirable that the solvent employed have a sufficiently low boiling point so that it can be removed readily at the conclusion of the hydrogenation reaction. Hydrogenation catalyst such as nickel on kieselguhr, Raney nickel, platinum, cobalt, palladium-on-charcoal, and the like are applicable. The hydrogenation temperature is generally within the range of from 20 to 200° C. at a pressure of from 20 to 2000 p. s. i. g. The hydrogenation is carried out in most instances until from 30 to 50 per cent of the double bonds are hydrogenated, although if desired as much as 90 per cent or more of the double bonds originally present are hydrogenated. The same general procedure can be used in effecting hydrogenation of the liquid polydiene prior to hydroxylation.

The monohydric alcohols employed in the preparation of these phosphorus-containing esters include such as methanol, propanol, butanol, hexanol, n-butanol, n-hexanol, and the like. This preparative method for the phosphorus-containing ester plasticizers of our invention is described in more detail in the copending application of J. C. Hillyer and L. O. Edmonds, referred to hereinabove. Although we prefer the method above referred to, employing phosphorus oxychloride as the esterification agent, any other suitable method for producing the neutral mixed phosphorus-containing ester plasticizers of our invention, can be employed.

The monocarboxylic organic acid esters of a hydroxylated liquid diene, suitable as plasticizers in accordance with our invention, can be prepared in any suitable manner. One such preparative method is disclosed in the copending application of J. C. Hillyer and L. O. Edmonds referred to above. As described in that copending application, a hydroxy liquid polydiene of the type herein described, either hydrogenated or unhydrogenated, is reacted with the organic acid or the corresponding anhydride, to produce the desired ester plasticizer. Organic acids applicable can be either saturated or unsaturated aliphatic or aromatic acids. Preferably the aliphatic acids contain not more than 20 carbon atoms in the molecule. When aromatic acids are employed it is generally preferred that they contain not to exceed 12 carbon atoms in the molecule. Suitable monobasic organic acids used in the esterification reaction with a liquid hydroxy polydiene include formic, acetic, caproic, caprylic, lauric, myristic, palmitic, stearic, acrylic, decylenic, dodecylenic, and oleic acid; benzoic acid and naphthoic acid, and alkyl derivatives of the aromatic acids last named. When anhydrides are employed instead of acids for preparing these monocarboxylic acid ester plasticizers, it is frequently preferred to use a catalyst for the reaction, particularly when a high degree of esterification is desired. Suitable catalysts are pyridine and sodium acetate.

The esterification reaction may be effected in the presence of a single acid, or anhydride, or a mixture of acids. In some instances one acid may be used and partial esterification effected after which a different acid is added and the reaction continued. Generally from 10 to 100 per cent of the hydroxy groups in hydroxypolydiene are esterified. It is frequently preferred to esterify to a lesser extent with high molecular weight acids than with low molecular weight acids; however, the properties desired in the product determine the extent to which the reaction is carried.

The degree of esterification can be controlled to a large extent by controlling the ratio of reactants. If an acid which is non-volatile under the reaction conditions is used, and if less than 100 per cent esterification is desired, the reaction is continued until the acid is consumed; however, if it is desired to obtain substantially complete esterification, it is generally preferred to use an excess of acid and allow the reaction to proceed until water is no longer formed. Esterification temperatures can be from 50 to 200° C., depending largely upon the activity of the monocarboxylic acid utilized.

The esterification reaction is preferably allowed to proceed until no more water is evolved or until all the monocarboxylic acid is consumed. The monocarboxylic organic acid ester plasticizers of this invention range from viscous liquid to hard, brittle solids with high softening points, the viscosity depending to a large extent upon the degree of hydroxylation of the liquid polydiene in the preparation of the hydroxy polydiene reactant, and to a lesser extent upon the degree of esterification; it also depends upon the viscosity of the liquid polydiene from which the hydroxylated liquid diene is prepared, in any case, increasing with an increase in any one of these variables.

The amount of plasticizer to be incorporated with the rubber or rubber-like material is in any case an amount sufficient to provide a resulting admixture of desired increased plasticity. Generally an amount of the plasticizer of our invention of from 1 to 25 parts by weight per 100 parts of the rubber or rubber-like material to be plasticized is sufficient, the preferred amount often being from 2 to 15 parts per hundred parts of rubber.

We can incorporate the softeners of our invention with the material to be plasticized by any suitable method, such as (1) adding the softener to a synthetic rubber latex and then coagulating same in accordance with latex masterbatch procedure, and (2) introducing the softener on the mill.

Our invention is well applied to plasticization of Perbunan rubbers prepared by copolymerizing acrylonitrile and 1,3-butadiene in a range of ratios of 10:90 to 40:60 parts by weight. By incorporating the softener materials of our invention with a Perbunan rubber and vulcanizing the mixture, we are able to prepare rubber products of particularly high swelling and low extractability characteristics, when contacted with hydrocarbons, particularly those comprising organic solvents, gasoline-like materials or jet fuels.

Rubber or rubber-like materials containing the softeners of our invention are preferably cured or vulcanized for a period of time in the range of from 20 to 75 minutes. In the accompanying claims, reference to a vulcanizate or product of vulcanization of a rubber or rubber-like material compound with a softener material of our invention means that the vulcanization occurred after admixture of these materials with each other.

The following examples serve to illustrate further our process for plasticizing natural and synthetic rubber, and new and novel plasticizer-containing compositions formed in accordance with our invention, by which we mean to include those new compositions in their form before vulcanization and also after vulcanization. The reactants and their proportions and the other specific ingredients employed, as illustrated in the examples, are presented as being typical and should not be construed to limit the invention unduly.

EXAMPLE I

Liquid polybutadiene, prepared by sodium catalyzed polymerization of 1,3-butadiene, having a viscosity of 418 Saybolt Furol seconds at 100° F. and a molecular weight of 835 (determined by freezing point lowering in benzene), was hydroxylated in a series of runs using varying amounts of a mixture containing equimolar quantities of hydrogen peroxide and formic acid. Details of the various runs are given below together with the results obtained.

| Run No | 1 | 2 | 3 | 4 | 5 |
|---|---|---|---|---|---|
| Mols $C_4$ (i. e., butadiene) units/mol $H_2O_2$ | 1 | 1 | 1 | 4 | 1 |
| Temperature, °F | [1]122 | 122 | 122 | 122 | 122 |
| Concentration of $H_2O_2$ [6] | 10 | 10 | 20 | 10 | 10 |
| Solvent | none | none | $CHCl_3$ | none | none |
| Reaction time, hours | 22 | 48 | 48 | 48 | 30 |
| Unconsumed $H_2O_2$, weight percent based on initial $H_2O_2$ added | 20 | 20 | 10 | -------- | 30 |
| Hydroxylated product solubility, percent: | | | | | |
| In acetone | 100 | 100 | 100 | 100 | 100 |
| In pentane | ([2]) | 23 | 1 | 100 | ([2]) |
| Analysis, percent: [3] | | | | | |
| C | 80.1 | 80.0 | 71.4 | 83.2 | 79.7 |
| H | 9.9 | 10.3 | 9.1 | 10.3 | 10.0 |
| O | 10.0 | 9.9 | 19.3 | 6.5 | 10.3 |
| Hydroxyl No | 285 | 181 | 357 | 152 | 284 |
| Saponification No | 43 | 30 | 85 | 13 | 40 |
| Calculated Analysis of hydroxylated product, percent: | | | | | |
| OH | 2.61 | 5.48 | 10.82 | 4.61 | 8.59 |
| OOCH | -------- | 2.41 | 6.81 | 1.04 | -------- |
| OH in OOCH | -------- | 0.91 | 2.58 | 0.39 | 1.20 |
| Total OH | -------- | 6.39 | 13.40 | 5.00 | 9.79 |
| O in OH and OOCH | -------- | 6.89 | 15.08 | 5.08 | -------- |
| Degree of hydroxylation [4] | 15.6 | 9.5 | 21 | 7.8 | 15 |
| Degree of formoxylation [5] | 2.4 | 1.5 | 5 | 0.8 | 2 |
| Hydroxy groups/$C_4$ unit | 0.31 | 0.19 | 0.42 | 0.16 | 0.30 |
| Formoxy groups/$C_4$ unit | 0.05 | 0.03 | 0.10 | 0.02 | 0.04 |

[1] Temperature increased to 149° F. on account of exothermic nature of the reaction but reactants were cooled immediately to 122° F. and held at that temperature.
[2] Pentane solubility not determined.
[3] Analysis of total sample in runs 1, 4, and 5; analysis on remaining sample after pentane extraction in runs 2 and 3.
[4] Percent of theoretically complete hydroxylation, assuming 2 hydroxyl groups per $C_4$ unit as theoretically complete hydroxylation.
[5] Percent of theoretically complete formoxylation, assuming 2 formoxyl groups per $C_4$ unit as theoretically complete formoxylation.
[6] Weight percent in aqueous $H_2O_2$ reagent.

Samples of hydroxylated liquid polybutadiene, as plasticizers, prepared as described above, were evaluated in a tread recipe using a 41° E, 60 Mooney, butadiene-styrene rubber. Plasticizers of Runs 1 and 2 were also evaluated in a tread recipe using natural rubber (smoked sheet). Total products (as plasticizers) of runs 1, 4, and 5, and plasticizer products of runs 2 and 3 remaining after pentane extraction were those tested. Controls were run in each test. The following tread recipes were employed:

| | Parts by Weight | |
|---|---|---|
| | A | B |
| Butadiene-styrene elastomer | 100 | -------- |
| Smoked sheet | -------- | 100 |
| Carbon black [1] | 50 | 50 |
| Zinc oxide | 3 | 4 |
| Stearic acid | 1 | 3 |
| Agerite powder [2] | -------- | 1.5 |
| Flexamine [3] | 1 | -------- |
| Sulfur | 1.75 | 2 |
| Santocure [4] | 1.0 | 0.4 |
| Plasticizer | Variable | 5 |

[1] Philblack O, a special furnace-type, high abrasion carbon black.
[2] Phenyl-beta-naphthylamine.
[3] A non-toxic powder, sp. gr. 1.10, M. P. 75–90° C., consisting of a physical mixture containing 65 percent of a complex diarylamine-ketone reaction product and 35 percent of N,N'-diphenyl-p-phenylenediamine.
[4] N-cyclohexyl-2-benzothiazolesulfenamide.

The rubber stocks were compounded and then cured 30 minutes at 307° F. and physical properties determined, which are shown in the following Tables I, II, III, and IV. The plasticizers designated as Numbers 1 to 5 throughout the Tables I to IV are those hydroxylated liquid polybutadiene products respectively of runs 1 to 5 summarized hereabove.

Table I.—*Physical propertes imparted by plasticizers 1 and 2 to 41° F. butadiene-styrene rubber (tread recipe A)*

UNAGED SAMPLES

| Plasticizer | PHR [4] | 80° F. | | | 200° F.[1] | | ΔT° F. | Percent Resilience | Flex Life, M.[5] | Shore Hardness | Percent Compression Set | MS 1½ at 212° F. | Meter Tack Separation Load, Grams |
|---|---|---|---|---|---|---|---|---|---|---|---|---|---|
| | | 300 percent Modulus, p. s. i. | Tensile, p. s. i. | Percent elongation | Tensile, p. s. i. | Percent elongation | | | | | | | |
| No. 1 | 5 | 1,360 | 3,530 | 585 | 2,220 | 345 | 85.1 | 58.6 | 28.4 | 59.0 | 20.7 | 42.0 | 198 |
| No. 2 | 5 | 1,260 | 3,590 | 590 | 1,920 | 350 | 81.1 | 60.1 | 19.3 | 60.0 | 20.6 | 42.0 | 212 |
| Circo-Para [2] | 5 | 1,350 | 3,620 | 585 | 1,740 | 310 | 71.9 | 61.1 | 25.5 | 57.0 | 19.2 | 40.0 | 194 |
| Koresin [3] | 5 | 1,270 | 3,710 | 620 | 1,920 | 315 | 79.4 | 58.1 | 28.2 | 57.0 | 22.1 | 42.0 | 375 |
| No. 1 | 10 | 1,030 | 3,120 | 650 | 1,700 | 320 | 112.2 | 52.8 | 29.3 | 59.0 | 25.1 | 40.0 | 204 |
| No. 2 | 10 | 1,280 | 3,390 | 620 | 1,780 | 350 | 100.3 | 51.0 | 19.8 | 64.0 | 22.9 | 44.0 | 200 |
| Circo-Para [2] | 10 | 1,130 | 3,760 | 655 | 2,000 | 400 | 73.3 | 60.3 | 31.5 | 54.0 | 21.6 | 35.5 | 158 |
| Koresin [3] | 10 | 990 | 3,550 | 660 | 2,140 | 440 | 92.0 | 56.9 | 21.2 | 55.0 | 17.0 | 38.0 | -------- |

OVEN AGED 24 HOURS AT 212° F.—

| No. 1 | 5 | 2,680 | 3,640 | 390 | -------- | -------- | 64.2 | 66.5 | 9.0 | 68.0 | -------- | -------- | -------- |
| No. 2 | 5 | 2,970 | 4,080 | 400 | -------- | -------- | 64.9 | 67.5 | 6.0 | 69.0 | -------- | -------- | -------- |
| Circo-Para [2] | 5 | 2,890 | 3,270 | 330 | -------- | -------- | 61.2 | 68.8 | 4.7 | 66.0 | -------- | -------- | -------- |
| Koresin [3] | 5 | 2,700 | 3,760 | 390 | -------- | -------- | 62.8 | 66.7 | 11.1 | 65.0 | -------- | -------- | -------- |
| No. 1 | 10 | 3,060 | 3,300 | 320 | -------- | -------- | 69.6 | 64.0 | 14.7 | 69.0 | -------- | -------- | -------- |
| No. 2 | 10 | 3,130 | 3,710 | 330 | -------- | -------- | 71.6 | 61.2 | 11.4 | 72.0 | -------- | -------- | -------- |
| Circo-Para [2] | 10 | 2,900 | 3,270 | 340 | -------- | -------- | 59.5 | 68.4 | 6.3 | 64.0 | -------- | -------- | -------- |
| Koresin [3] | 10 | -------- | 2,580 | 250 | -------- | -------- | 64.2 | 65.5 | 10.7 | 64.5 | -------- | -------- | -------- |

[1] 45 minute cure time.
[2] Control, 1:1 blend of Circosol 2XH and Paraflux. Circosol 2XH: a petroleum hydrocarbon softener, containing hydrocarbons of high molecular weight, in the form of a heavy, viscous, transparent, pale green, odorless liquid of low volatility; sp. gr. 0.940; saybolt viscosity at 100° F., about 2,000 seconds. Paraflux: an asphaltic flux.
[3] Control, condensation product of tertiary butylphenol and acetylene.
[4] Parts plasticizer per hundred parts rubber.
[5] Thousands of flexures to failure.

Table II.—Physical properties imparted by plasticizers 1 and 2 to natural rubber (tread recipe B)

UNAGED SAMPLES

| Plasticizer | PHR[3] | 80° F. | | | 200° F. | | ΔT° F. | Percent Resilience | Flex[2] Life, M | Shore Hardness | Percent Compression Set | MS 1½ at 212° F. | Meter Tack Separation Load, Grams |
|---|---|---|---|---|---|---|---|---|---|---|---|---|---|
| | | 300 percent Modulus, p.s.i. | Tensile, p.s.i. | Percent elongation | Tensile, p.s.i. | Percent elongation | | | | | | | |
| No. 1 | 5 | 1,110 | 2,550 | 500 | 1,460 | 500 | 68.6 | 66.1 | 11 | 56.0 | 30.5 | 38.0 | 475 |
| No. 2 | 5 | 1,260 | 2,940 | 515 | 1,540 | 370 | 81.8 | 64.9 | 15 | 59.0 | 29.9 | 39.0 | 555 |
| Circo-Para[1] | 5 | 1,470 | 3,050 | 485 | 2,180 | 500 | 47.9 | 73.9 | 31 | 56.0 | 21.6 | 39.0 | 350 |
| Koresin[1] | 5 | 1,300 | 2,580 | 480 | 1,940 | 455 | 44.6 | 71.5 | 12 | 56.0 | 21.8 | 36.5 | 500 |

OVEN AGED 24 HOURS AT 212° F.

| No. 1 | 5 | | 120 | 210 | | | 95.9 | 62.7 | (*) | 55.0 | | | |
| No. 2 | 5 | | 190 | 200 | | | 83.9 | 61.8 | (*) | 59.0 | | | |
| Circo-Para[1] | 5 | | 280 | 210 | | | 51.7 | 72.4 | (*) | 55.0 | | | |
| Koresin[1] | 5 | | 300 | 200 | | | 53.0 | 71.2 | (**) | 58.0 | | | |

[1] Controls, see Table I, notes (2) and (3).
[2] Percent broken at 50,000 flexures.
[3] Parts plasticizer per hundred parts rubber.
*Surface breaks across at 3.8.
**Aged 36 hours, surface breaks across at 0.2.

Table III.—Physical properties imparted by plasticizers 3, 4, and 5 to 41° F. butadiene-styrene rubber (tread recipe A)

UNAGED SAMPLES

| Plasticizer | PHR[4] | 80° F. | | | 200° F.[2] Tensile, p.s.i. | ΔT° F. | Percent Resilience | Flex Life, M | Shore Hardness | Percent Compression Set | MS 1½ at 212° F. | Meter Tack Separation Load, Grams |
|---|---|---|---|---|---|---|---|---|---|---|---|---|
| | | 300 Percent Modulus, p.s.i. | Tensile, p.s.i. | Percent Elongation | | | | | | | | |
| No. 3 | 5 | 1,370 | 3,280 | 545 | 2,100 | 104.8 | 57.2 | 20.4 | 62 | 24.4 | 47 | 190 |
| No. 4 | 5 | 1,320 | 3,100 | 515 | 1,500 | 83.6 | 59.8 | 31.7 | 56 | 23.6 | 43 | 210 |
| Circo-Para[1] | 5 | 1,500 | 3,830 | 565 | 2,060 | 73.0 | 61.5 | 32.2 | 57 | 19.9 | 43 | 225 |
| Koresin[1] | 5 | 1,310 | 4,090 | 600 | 2,040 | 80.1 | 59.5 | 25.7 | 59 | 19.6 | 45 | 410 |
| No. 3 | 10 | 1,000 | 2,380 | 565 | 1,340 | | 49.2 | 25.2 | 65 | 26.7 | 46 | 150 |
| No. 4 | 10 | 920 | 3,170 | 675 | 1,700 | 94.2 | 54.5 | 37.0 | 57 | 25.7 | 40 | 200 |
| Circo-Para[1] | 10 | 1,150 | 3,940 | 660 | 1,860 | 79.4 | 59.8 | 26.6 | 55 | 22.5 | 36 | 170 |
| Koresin[1] | 10 | 1,000 | 3,860 | 680 | 2,160 | 99.5 | 58.8 | 28.3 | 55.5 | 22.9 | 37 | 410 |
| No. 5 / Circo-Para[1] | 2 / 3 | 1,510 | 3,530 | 555 | 2,080 | 78.7 | 61.9 | 31.9 | 60 | | 56.5 | 210 |
| No. 5 / Paraflux[3] | 2 / 3 | 1,540 | 3,660 | 565 | 2,220 | 79.1 | 62.5 | 24.5 | 62 | | 50.5 | 200 |
| No. 5 | 5 | 1,490 | 3,520 | 545 | 2,100 | 85.6 | 60.8 | 19.0 | 63 | | 51 | 210 |
| Circo-Para[1] | 5 | 1,480 | 3,700 | 545 | 2,080 | 75.0 | 63.4 | 18.0 | 60.5 | | 48 | 190 |
| No. 5 / Circo-Para[1] | 4 / 6 | 1,140 | 3,460 | 635 | 1,880 | 82.5 | 61.7 | 30.1 | 60 | | 44.5 | 205 |
| No. 5 | 10 | 1,120 | 3,280 | 630 | 2,020 | 98.5 | 55.1 | 19.6 | 64 | | 48 | 215 |
| Circo-Para[1] | 10 | 1,220 | 3,380 | 580 | 2,020 | 78.7 | 63.1 | 18.4 | 58 | | 42 | 200 |

OVEN AGED 24 HOURS AT 212° F.

| No. 3 | 5 | 2,870 | 3,940 | 400 | | 77.7 | 62.8 | 17.8 | 66 | | | |
| No. 4 | 5 | 2,410 | 4,040 | 420 | | 67.2 | 66.7 | 21.8 | 64 | | | |
| Circo-Para[1] | 5 | 2,580 | 3,400 | 380 | | 63.2 | 66.1 | 16.1 | 64 | | | |
| Koresin[1] | 5 | 2,400 | 3,210 | 380 | | 64.9 | 64.4 | 16.8 | 64 | | | |
| No. 3 | 10 | 2,040 | 2,770 | 400 | | 103.8 | 59.0 | 19.4 | 70 | | | |
| No. 4 | 10 | 2,130 | 3,220 | 410 | | 67.6 | 62.4 | 16.2 | 64 | | | |
| Circo-Para[1] | 10 | 2,350 | 4,030 | 460 | | 61.5 | 66.4 | 9.2 | 61 | | | |
| Koresin[1] | 10 | 2,220 | 3,890 | 450 | | 75.0 | 62.4 | 21.2 | 60 | | | |
| No. 5 / Circo-Para[1] | 2 / 3 | 2,720 | 3,630 | 385 | | 66.9 | 68.6 | 11.7 | 66 | | | |
| No. 5 / Paraflux[3] | 2 / 3 | 2,820 | 3,760 | 385 | | 69.3 | 68.2 | 19.5 | 67.5 | | | |
| No. 5 | 5 | 2,720 | 3,520 | 360 | | 70.9 | 66.9 | 22.9 | 69 | | | |
| Circo-Para[1] | 5 | 2,660 | 3,650 | 395 | | 64.9 | 69.4 | 6.9 | 66 | | | |
| No. 5 / Circo-Para[1] | 4 / 6 | 2,320 | 3,360 | 430 | | 66.9 | 66.5 | 15.3 | 66 | | | |
| No. 5 | 10 | 2,400 | 3,460 | 415 | | 76.7 | 60.7 | 15.0 | 70 | | | |
| Circo-Para[1] | 10 | 2,300 | 3,440 | 420 | | 63.2 | 68.9 | 7.6 | 64 | | | |

[1] Controls, see Table I, notes (2) and (3).
[2] 45 minute cure time.
[3] An asphaltic flux.
[4] Parts plasticizer per hundred parts rubber.

The hydroxylated liquid polybutadiene plasticizer No. 5 was evaluated in the following carcass recipe C using a 41° F. butadiene-styrene elastomer.

| | Parts by weight |
|---|---|
| Butadiene-styrene elastomer | 100 |
| Philblack O [1] | 25 |
| Zinc oxide | 3 |
| Stearic acid | 1 |
| Sulfur | 2.5 |
| Santocure [1] | 1 |
| A-32 [2] | 0.2 |
| Agerite resin D [3] | 1 |
| Plasticizer: | |
|   Paraflux [1], | variable as indicated in Table IV. |
|   Staybelite resin [4], | variable as indicated in Table IV. |
|   Plasticizer No. 5, | variable as indicated in Table IV. |

[1] Previously defined.
[2] Reaction product of butyraldehyde and butylidene aniline.
[3] Polymerized trimethyldihydroquinoline.
[4] Hydrogenated rosin.

After compounding and then curing 30 minutes at 307° F., physical properties were determined on the compounded stocks. The following results were obtained:

and at 760 mm. pressure, 660–760° F.; viscosity at 27° C., 8 cps.).

The samples were mixed and cured at 307° F. for 30 minutes. Swelling tests were made on the cured samples by immersing them in a mixture containing 30 per cent toluene and 70 per cent isooctane at room temperature (78–80° F.) for seven days. Extractability tests were also made, the quantity of extracted material being determined by evaporating the immersion liquid at the conclusion of the swelling test, drying the residue in an oven at 220° F. for 30 minutes, and weighing. The following results were obtained:

| Plasticizer | Percent Extractable | Percent Volume Swell |
|---|---|---|
| Hydroxylated liquid polybutadiene product of Run No. 1 | 2.5 | 48.8 |
| Hydroxylated liquid polybutadiene product of Run No. 2 | 1.7 | 49.2 |
| Hydroxylated liquid polybutadiene product of Run No. 4 | 2.8 | 50.2 |
| TP-90B | 4.7 | 37.2 |
| Flexol TOF | 6.5 | 35.2 |

The high swelling and low extractability characteristics imparted to the butadiene-acrylonitrile copolymer by the Table IV.—Evaluation of hydroxylated polybutadiene plasticizer in carcass stock recipe C

UNAGED SAMPLES

| Plasticizer | PHR | 80° F. | | | 200° F.[1] Tensile, p.s.i. | ΔT° F. | Percent Resilience | Flex Life, M | Shore Hardness | Percent Compression Set | MS 1½ at 212° F. | Meter Tack Separation Load, grams |
|---|---|---|---|---|---|---|---|---|---|---|---|---|
| | | 300 Percent Modulus, p.s.i. | Tensile, p.s.i. | Percent Elongation | | | | | | | | |
| No. 5 | 5.0 | 970 | 4,050 | 610 | 850 | 43.9 | 76.4 | 6.0 | 55 | 11.8 | 35 | 285 |
| No. 5 / Staybelite Resin | 5.0 / 2.5 | 920 | 4,030 | 630 | 1,080 | 43.6 | 76.0 | 7.2 | 54 | 13.5 | 33.5 | 300 |
| No. 5 / Paraflux | 2.5 / 5.0 | 880 | 4,070 | 630 | 890 | 41.2 | 77.0 | 3.4 | 53 | 12.4 | 31.5 | 310 |
| Paraflux / Staybelite Resin | 5.0 / 2.5 | 790 | 4,160 | 605 | 810 | 39.9 | 77.6 | 1.5 | 51 | 11.7 | 32.5 | 320 |

OVEN AGED 24 HOURS AT 212° F.

| Plasticizer | PHR | 300 Percent Modulus, p.s.i. | Tensile, p.s.i. | Percent Elongation | 200° F. Tensile, p.s.i. | ΔT° F. | Percent Resilience | Flex Life, M | Shore Hardness | | | |
|---|---|---|---|---|---|---|---|---|---|---|---|---|
| No. 5 | 5.0 | 1,490 | 3,230 | 460 | 810 | 39.9 | 79.4 | 0.8 | 59 | | | |
| No. 5 / Staybelite Resin | 5.0 / 2.5 | 1,540 | 3,300 | 465 | 920 | 40.2 | 78.7 | 1.3 | 58 | | | |
| No. 5 / Paraflux | 2.5 / 5.0 | 1,370 | 2,940 | 460 | 750 | 37.8 | 79.6 | 0.6 | 56 | | | |
| Paraflux / Staybelite Resin | 5.0 / 2.5 | 1,430 | 2,980 | 450 | 840 | 36.1 | 80.3 | <0.6 | 56 | | | |

[1] 45 minute cure.

EXAMPLE II

Samples of three hydroxylated liquid polybutadiene plasticizers designated as Nos. 1, 2, and 4 in Example I were employed as softeners for a 74/26 butadiene-acrylonitrile copolymer using the following compounding recipe:

| | Parts by weight |
|---|---|
| Butadiene-acrylonitrile copolymer | 100 |
| Carbon black [1] | 60 |
| Zinc oxide | 5 |
| Stearic acid | 1.5 |
| Sulfur | 1.5 |
| Benzothiazyl disulfide [2] | 1.5 |
| Plasticizer | 10 |

[1] Philblack A, medium abrasion furnace black.
[2] Altax.

Two controls were run using, instead of a hydroxylated polybutadiene plasticizer, the following: (1) Flexol TOF (tri-2-ethylhexylphosphate); (2) TP-90B (a high molecular weight polyether with the following properties: nontoxic, light-straw to brown-colored liquid with little or no odor; sp. gr. 0.967; B. P. at 4 mm. pressure, 200° C.

hydroxylated liquid polybutadiene plasticizers make these plasticizers valuable for use in the manufacture of rubber compositions which are to be employed in contact with hydrocarbon solvents, such as gaskets, fuel tank linings, and the like.

EXAMPLE III

One hundred grams of the hydroxy liquid polybutadiene product of run No. 5 of Example I was dissolved in 400 cc. of purified dioxane and hydrogenated in the presence of 0.5 gram palladium-on-charcoal and under a hydrogen pressure of 900 p. s. i. g. Hydrogenation was continued for 16 hours, i. e., until no further drop in pressure occurred. The palladium-on-charcoal was removed from the resulting hydrogenation reaction mixture by filtration, and the dioxane by stripping.

Sixty grams of the resulting hydrogenated hydroxy liquid polybutadiene was charged to a reactor together with one liter of diethyl ether and 47 grams of phosphorous oxychloride. The mixture was refluxed in an atmosphere of nitrogen for 24 hours and then stirred at room temperature for 64 hours. Butanol (45 grams) was then added dropwise while the temperature was held at −5 to +5° C. The reaction mixture was stirred for 16 hours at room temperature. Ether was stripped from the resulting homogeneous mixture, the last portions being removed under vacuum. The product was a dark colored, viscous liquid which was found upon analysis to have the following composition:

|    | Found, Percent | Calculated, Percent [1] |
| --- | --- | --- |
| C | 53.8 | 64.2 |
| H | 9.3 | 10.9 |
| Cl | 3.5 | 0.0 |
| P | 7.6 | 7.7 |

[1] Assuming complete esterification of sample of hydroxy liquid polybutadiene from Run No. 5, Example I, based on type (1) phosphorus ester formula.

The phosphorus-containing ester described above was evaluated as a plasticizer in the following tread recipe using a 41° F., 60 Mooney (ML–4), 71/29 butadiene-styrene rubber.

| | Parts by weight |
| --- | --- |
| Butadiene-styrene rubber | 100 |
| Carbon black [1] | 50 |
| Zinc oxide | 3 |
| Stearic acid | 1 |
| Flexamine [2] | 1 |
| Plasticizer | 10 |
| Sulfur | 1.75 |
| Santocure [3] | 1.0 |

[1] Philblack O, a furnace-type, high abrasion carbon black.
[2] A physical mixture containing 65 per cent of a complex diarylamine-ketone reaction product and 35 per cent of N,N'-diphenyl-p-phenylenediamine.
[3] N-cyclohexyl-2-benzothiazolesulfenamide.

The rubber stocks were compounded and then cured 30 minutes at 307° F. and physical properties of the resulting vulcanizate determined. The following results were obtained:

*Unaged sample*

Stress-strain properties at 80° F.:
   300 percent modulus, p. s. i. _____ 1240
   Tensile, p. s. i. _____ 3160
   Elongation, per cent _____ 605
Stress-strain properties at 200° F., 45 minute cure:
   Tensile, p. s. i. _____ 1960
Hysteresis, ΔT° F. _____ 107.4
Resilience, per cent _____ 57.4
Flex life, M _____ 18.5
Shore hardness _____ 61.5
Compression set, per cent _____ 26.5
Compounded Mooney, MS 1½ at 212° F. _____ 42
Extrusion at 250° F., grams/minute _____ 90

*Oven aged 24 hours at 212° F.*

Stress-strain properties at 80° F.:
   300 per cent modulus, p. s. i. _____ 2640
   Tensile, p. s. i. _____ 3310
   Elongation, per cent _____ 370
Hysteresis, ΔT° F. _____ 84.1
Resilience, per cent _____ 63.4

EXAMPLE IV

The phosphorus-containing ester of Example III together with a control for comparison, was employed as a plasticizer with a 74/26 butadiene-acrylonitrile copolymer using the following compounding recipe:

| | Parts by weight |
| --- | --- |
| Butadiene-acrylonitrile copolymer | 100 |
| Carbon black [1] | 60 |
| Zinc oxide | 5 |
| Stearic acid | 1.5 |
| Benzothiazyl disulfide [2] | 1.5 |
| Plasticizer | 10 |
| Sulfur | 1.5 |

[1] Philblack A, medium abrasion furnace black.
[2] Altax.

The rubber stocks were compounded and then cured at 307° F. for 30 minutes. A control was run using TP-90B (a high molecular weight polymer). The results were as follows:

| Plasticizer | At 80° F. | | | | Gehman Freeze Point, ° C. |
| --- | --- | --- | --- | --- | --- |
| | Tensile | Percent Elongation | Percent Swell [1] | Percent Extractable [2] | |
| Phosphorus-containing ester | 2,970 | 275 | 44.6 | 1.6 | −30 |
| TP-90B | 2,670 | 345 | 36.8 | 5.8 | −38 |

OVEN AGED 24 HOURS AT 212° F

| Plasticizer | Tensile | Percent Elongation | | | |
| --- | --- | --- | --- | --- | --- |
| Phosphorus-containing ester | 3,050 | 185 | | | |
| TP-90B | 2,940 | 255 | | | |

[1] Swelling tests were made on the cured samples by immersing them in a mixture containing 30 percent toluene and 70 percent isooctane at room temperature (80° F.) for seven days.
[2] The quantity of extracted material was determined by evaporating the immersion liquid at the conclusion of the swelling test, drying the residue in an oven at 220° F. for 30 minutes, and weighing.

EXAMPLE V

A 100 gram portion of the hydroxylated liquid polybutadiene product of run No. 5 in Example I was dissolved in 500 cc. benzene and charged to a reactor together with 129 cc. of acetic anhydride and one gram of fused sodium acetate. The mixture was refluxed for 4 hours, allowed to stand for several hours and then poured into water. A resulting water insoluble portion was washed with water, aqueous potassium carbonate, again with water and then dried. Benzene was removed in vacuo at 90° C. The resulting product was an acetic ester of the hydroxylated liquid polybutadiene, and was a clear, yellow, viscous material having a hydroxyl number of 110 and a saponification number of 140.

Another 100 gram portion of the hydroxylated liquid polybutadiene of run 5 of Example I was charged together with 35 grams of oleic acid (sufficient to give one equivalent of acid to 4 equivalents of hydroxyl) to a reactor and the mixture heated for two hours at 200° C. at 45 mm. mercury absolute pressure. The resulting product was an oleate of the hydroxylated polybutadiene and was a brownish-yellow, soft, slightly tacky, spongy material. The two esters prepared as described above, i. e., the acetate and the oleate, were each evaluated as plasticizers in the following tread recipe using a 41° F., 60 Mooney (ML–4), 71/29 butadiene-styrene rubber:

| | Parts by weight |
| --- | --- |
| Butadiene-styrene rubber | 100 |
| Carbon black [1] | 50 |
| Zinc oxide | 3 |
| Stearic acid | 1 |
| Flexamine [2] | 1 |
| Sulfur | 1.75 |
| Santocure [3] | 1 |
| Plasticizer | 10 |

[1] Philblack O, a furnace-type, high abrasion carbon black.
[2] A physical mixture containing 65 per cent of a complex diarylamine-ketone reaction product and 35 per cent of N,N'-diphenyl-p-phenylenediamine.
[3] N-cyclohexyl-2-benzothiazolesulfenamide.

The rubber stocks were compounded and then cured 30 minutes at 307° F. and physical properties of the resulting vulcanizate determined as follows:

|  | Plasticizer | |
|---|---|---|
|  | (1) Acetate | (2) Oleate |
| Unaged Samples: | | |
| Stress-strain properties at 80° F.— | | |
| 300 percent modulus, p. s. i. | 1,050 | 1,250 |
| Tensile, p. s. i. | 3,180 | 3,470 |
| Elongation, percent | 650 | 615 |
| Stress-strain properties at 200° F. (45 minute cure)— | | |
| 300 percent modulus, p. s. i. | 1,220 | ---------- |
| Tensile, p. s. i. | 1,720 | 2,100 |
| Hysteresis, ΔT° F. | 101.7 | 79.7 |
| Resilience, percent | 57.1 | 55.6 |
| Flex life, M | 22.1 | 46.5 |
| Shore hardness | 60 | 59.5 |
| Compression set, percent | 24.9 | 21.6 |
| Compounded Mooney (MS 1½) at 212° F. | 48.5 | 45 |
| Extrusion, grams/minute | 85 | 101 |
| Gehman F. P., ° C. | −51 | −45 |
| Tack, separation load after 8 days, grams | 220 | ---------- |
| Oven Aged 24 Hours at 212° F.: | | |
| Stress-strain properties at 80° F.— | | |
| 300 percent modulus, p. s. i. | 2,110 | 2,300 |
| Tensile, p. s. i. | 3,350 | 3,590 |
| Elongation, percent | 440 | 440 |
| Hysteresis, ΔT° F. | 78.4 | 66.2 |
| Resilience, percent | 61.8 | 60.7 |
| Flex life, M | 13.4 | 23.0 |
| Shore hardness | 68 | 67 |

EXAMPLE VI

The acetate and oleate esters of Example V were evaluated as plasticizers in a 74/26 butadiene-acrylonitrile copolymer using the following compounding recipe:

|  | Parts by weight |
|---|---|
| Butadiene-acrylonitrile copolymer | 100 |
| Carbon black [1] | 60 |
| Zinc oxide | 5 |
| Stearic acid | 1.5 |
| Sulfur | 1.5 |
| Benzothiazyl disulfide [2] | 1.5 |
| Plasticizer | 10 |

[1] Philblack A, medium abrasion furnace black.
[2] Altax.

The two plasticizers were evaluated at different times and each time a control was run using TP-90B (a high molecular weight polyether). The samples were mixed and cured at 307° F. for 30 minutes. The results were as follows:

| Plasticizer | 80° F. | | | Percent Compression Set | Percent Swell [1] | Percent Extractable [1] | Gehman Freeze Point °C. |
|---|---|---|---|---|---|---|---|
|  | 300 percent Modulus, p. s. i. | Tensile, p. s. i. | Percent Elongation | | | | |
| Acetate [1] TP-90B | 1,780 | 2,280 | 355 | 15.9 | 47.0 | 2.3 | −31 |
|  | 1,980 | 2,480 | 370 | 16.9 | 36.4 | 5.2 | −42 |
| Oleate [2] TP-90B | 2,160 | 2,570 | 355 | ---------- | 48.8 | 2.1 | −30 |
|  | 2,260 | 2,670 | 345 | ---------- | 36.8 | 5.8 | −38 |

[1] Swelling tests were made on the cured samples by immersing them in a mixture containing 30 percent toluene and 70 percent isooctane at room temperature (80° F.) for seven days.
[2] The quantity of extracted material was determined by evaporating the immersion liquid at the conclusion of the swelling test, drying the residue in an oven at 220° F. for 30 minutes, and weighing.

As will be evident to those skilled in the art, various modifications can be made or followed, in the light of the foregoing disclosure and discussion, without departing from the spirit or scope of the disclosure or from the scope of the claims.

We claim:

1. An improved method for increasing the plasticity of a rubbery polymeric sulfur-vulcanizable organic plastic substance containing unsaturated carbon-to-carbon bonds, which method comprises incorporating into 100 parts by weight of said substance, as a plasticizing agent therefor, from 1 to 25 parts by weight of a derivative of a liquid polymer of a conjugated diene containing from 4 to 6 carbon atoms per molecule, said polymer having a viscosity within the range 100 to 6000 Saybolt Furol Seconds at 100° F., and an unsaturation within the range 0.7 to 0.9 double bond per diene unit, said derivative being selected from the group consisting of (1) a hydroxylated product of said polymer containing at least two hydroxyl groups per molecule attached to adjacent carbon atoms; (2) a neutral mixed phosphorus-containing ester of said hydroxylated product and a monohydric alcohol containing from 1 to 8 carbon atoms per molecule; and (3) a monocarboxylic organic acid ester of said hydroxylated product.

2. The method of claim 1 wherein said rubbery polymeric sulfur-vulcanizable organic plastic substance is a copolymer of butadiene and styrene, said polymer is a polymer of butadiene, said derivative is a hydroxylated product of said polymer containing at least two hydroxyl groups per molecule attached to adjacent carbon atoms, and said incorporating is effected by adding said derivative to said rubbery polymeric sulfur-vulcanizable organic plastic substance while the latter is in the form of a latex and coagulating said latex.

3. The method of claim 1 wherein said rubbery polymeric sulfur-vulcanizable organic plastic substance is a copolymer of butadiene and acrylonitrile, said polymer is a polymer of butadiene, said derivative is a hydroxylated product of said polymer containing at least two hydroxyl groups per molecule attached to adjacent carbon atoms, and said incorporating is effected by milling said derivative into said copolymer.

4. As a new composition, a rubbery polymeric sulfur-vulcanizable organic plastic substance containing unsaturated carbon-to-carbon bonds, having incorporated therein a derivative of a liquid polymer of a conjugated diene containing from 4 to 6 carbon atoms per molecule, said polymer having a viscosity within the range 100 to 6000 Saybolt Furol Seconds at 100° F., and an unsaturation within the range 0.7 to 0.9 double bond per diene unit, said derivative being selected from the group consisting of (1) a hydroxylated product of said polymer containing at least two hydroxyl groups per molecule attached to adjacent carbon atoms; (2) a neutral mixed phosphorus-containing ester of said hydroxylated product and a monohydric alcohol containing from 1 to 8 carbon atoms per molecule; and (3) a monocarboxylic acid ester of said hydroxylated product.

5. A composition according to claim 4 wherein said derivative is a neutral mixed phosphorus-containing ester of said hydroxylated product and a monohydric alcohol containing from 1 to 8 carbon atoms per molecule, and from 1 to 100 percent of the available hydroxyl groups of said product are esterified.

6. A composition according to claim 4 wherein said derivative is a neutral mixed phosphorus-containing ester of said hydroxylated product and a monohydric alcohol containing from 1 to 8 carbon atoms per molecule, said hydroxylated product having been partially hydrogenated prior to the esterification thereof.

7. A composition according to claim 4 wherein said derivative is a monocarboxylic acid ester of said hydroxylated product, said acid containing from 1 to 20 carbon atoms per molecule.

8. A composition comprising 100 parts by weight of a synthetic rubber-like material compounded with from 1 to 25 parts by weight of a derivative of a liquid polymer of a conjugated diene containing from 4 to 6 carbon atoms per molecule, said polymer having a viscosity in the range 100 to 6000 Saybolt Furol Seconds at 100° F., and an unsaturation in the range 0.7 to 0.9 double bonds per diene unit, said derivative being selected from the group consisting of (1) a hydroxylated product of said polymer containing at least two hydroxyl groups per molecule attached to adjacent carbon atoms; (2) a neutral mixed phosphorus-containing ester of said hydroxylated product and a monohydric alcohol containing from 1 to 8 carbon atoms per molecule; and (3) a monocarboxylic acid ester of said hydroxylated product.

9. A composition according to claim 8 wherein said rubber-like material is a copolymer of butadiene and styrene, said polymer is a polymer of butadiene, and said derivative is a hydroxylated product of said polymer containing at least two hydroxyl groups per molecule attached to adjacent carbon atoms.

10. A composition according to claim 8 wherein said polymer is a polymer of 1,3-butadiene.

11. A composition according to claim 8 wherein said rubber-like material is a copolymer of butadiene and styrene, said polymer is a polymer of butadiene, and said derivative is a monocarboxylic acid ester of said hydroxylated product.

12. A composition according to claim 8 wherein said rubber-like material is a copolymer of 1,3-butadiene and acrylonitrile, said polymer is a polymer of butadiene, and said derivative is an acetate ester of said hydroxylated product.

13. A composition according to claim 8 wherein said rubber-like material is a copolymer of 1,3-butadiene and acrylonitrile, said polymer is a polymer of butadiene, and said derivative is a neutral mixed phosphorus-containing ester of said hydroxylated product and butanol.

14. A composition comprising 100 parts by weight of natural rubber compounded with from 1 to 25 parts by weight of a derivative of a liquid polymer of a conjugated diene containing from 4 to 6 carbon atoms per molecule, said polymer having a viscosity in the range 100 to 6000 Saybolt Furol Seconds at 100° F., and an unsaturation in the range of 0.7 to 0.9 double bonds per diene unit, said derivative being selected from the group consisting of (1) a hydroxylated product of said polymer containing at least two hydroxyl groups per molecule attached to adjacent carbon atoms; (2) a neutral mixed phosphorus-containing ester of said hydroxylated product and a monohydric alcohol containing from 1 to 8 carbon atoms per molecule; and (3) a monocarboxylic acid ester of said hydroxylated product.

15. A product of vulcanization of 100 parts by weight of natural rubber which has been vulcanized with sulfur in the presence of from 1 to 25 parts by weight of a derivative of a liquid polymer of a conjugated diene containing from 4 to 6 carbon atoms per molecule, said polymer having a viscosity in the range 100 to 6000 Saybolt Furol Seconds at 100° F., and an unsaturation in the range 0.7 to 0.9 double bonds per diene unit, said derivative being selected from the group consisting of (1) a hydroxylated product of said polymer containing at least two hydroxyl groups per molecule attached to adjacent carbon atoms; (2) a neutral mixed phosphorus-containing ester of said hydroxylated product and a monohydric alcohol containing from 1 to 8 carbon atoms per molecule; and (3) a monocarboxylic acid ester of said hydroxylated product.

16. A product of vulcanization of 100 parts by weight of a synthetic rubber-like material which has been vulcanized with sulfur in the presence of from 1 to 25 parts by weight of a derivative of a liquid polymer of a conjugated diene containing from 4 to 6 carbon atoms per molecule, said polymer having a viscosity in the range 100 to 6000 Saybolt Furol Seconds at 100° F., and an unsaturation in the range of 0.7 to 0.9 double bonds per diene unit, said derivative being selected from the group consisting of (1) a hydroxylated product of said polymer containing at least two hydroxyl groups per molecule attached to adjacent carbon atoms; (2) a neutral mixed phosphorus-containing ester of said hydroxylated product and a monohydric alcohol containing from 1 to 8 carbon atoms per molecule; and (3) a monocarboxylic acid ester of said hydroxylated product.

17. A vulcanizate according to claim 16 wherein said rubber-like material is a copolymer of butadiene and styrene, said polymer is a polymer of butadiene, and said derivative is a hydroxylated product of said polymer containing at least two hydroxyl groups per molecule attached to adjacent carbon atoms.

18. A vulcanizate according to claim 16 wherein said rubber-like material is a copolymer of 1,3-butadiene and acrylonitrile, said polymer is a polymer of butadiene, and said derivative is a neutral mixed phosphorus-containing ester of said hydroxylated product and butanol.

19. A vulcanizate according to claim 16 wherein said rubber-like material is a copolymer of 1,3-butadiene and acrylonitrile, said polymer is a polymer of butadiene, and said derivative is an acetate ester of said hydroxylated product.

20. As a new article of manufacture a gasket comprising vulcanized rubbery copolymer of 1,3-butadiene and acrylonitrile compounded with a derivative of a liquid polymer of a conjugated diene containing from 4 to 6 carbon atoms per molecule, said polymer having a viscosity in the range 100 to 6000 Saybolt Furol Seconds at 100° F., and an unsaturation in the range 0.7 to 0.9 double bond per diene unit, said derivative being selected from the group consisting of (1) a hydroxylated product of said polymer containing at least two hydroxyl groups per molecule attached to adjacent carbon atoms; (2) a neutral mixed phosphorus-containing ester of said hydroxylated product and a monohydric alcohol containing from 1 to 8 carbon atoms per molecule; and (3) a monocarboxylic acid ester of said hydroxylated product.

21. As a new article of manufacture, a tank, a liner bonded to said tank, said liner being fabricated from a vulcanized rubbery copolymer of 1,3-butadiene and acrylonitrile, compounded with a derivative of a liquid polymer of a conjugated diene containing from 4 to 6 carbon atoms per molecule, said polymer having a viscosity in the range 100 to 6000 Saybolt Furol Seconds at 100° F., and an unsaturation in the range 0.7 to 0.9 double bond per diene unit, said derivative being selected from the group consisting of (1) a hydroxylated product of said polymer containing at least two hydroxyl groups per molecule attached to adjacent carbon atoms; (2) a neutral mixed phosphorus-containing ester of said hydroxylated product and a monohydric alcohol containing from 1 to 8 carbon atoms per molecule; and (3) a monocarboxylic acid ester of said hydroxylated product.

22. A composition comprising 100 parts by weight of natural rubber compounded with from 1 to 25 parts by weight of a derivative of a liquid polymer of butadiene, said polymer having a viscosity in the range 100 to 6000 Saybolt Furol Seconds at 100° F. and an unsaturation in the range 0.7 to 0.9 double bond per diene unit, said derivative being a hydroxylated product of said polymer containing at least two hydroxyl groups per molecule attached to adjacent carbon atoms.

23. A composition comprising 100 parts by weight of a rubber-like copolymer of 1,3-butadiene and acrylonitrile compounded with from 1 to 25 parts by weight of a derivative of a liquid polymer of butadiene, said polymer having a viscosity in the range 100 to 6000 Saybolt Furol Seconds at 100° F. and an unsaturation in the range 0.7 to 0.9 double bond per diene unit, said derivative being a hydroxylated product of said polymer containing at least two hydroxyl groups per molecule attached to adjacent carbon atoms.

24. A product of vulcanization, with sulfur, of 100 parts by weight of a rubbery copolymer of 1,3-butadiene and acrylonitrile having incorporated therein from 1 to 25 parts by weight of a derivative of a liquid polymer of butadiene, said polymer having a viscosity in the range 100 to 6000 Saybolt Furol Seconds at 100° F., and an unsaturation in the range 0.7 to 0.9 double bond per diene unit, said derivative being a hydroxylated product of said polymer containing at least two hydroxyl groups per molecule attached to adjacent carbon atoms.

25. As a new composition, a rubbery, sulfur-vulcanizable, organic plastic substance containing unsaturated carbon-to-carbon bonds, having incorporated therein a derivative of a liquid polymer of a conjugated diene containing from 4 to 6 carbon atoms per molecule, said polymer having a viscosity within the range 100 to 6000 Saybolt Furol Seconds at 100° F., and an unsaturation within the range 0.7 to 0.9 double bond per diene unit, said derivative being a hydroxylated product of said polymer containing at least two hydroxyl groups per molecule attached to adjacent carbon atoms and having a hydroxyl number in the range 100 to 400.

26. As a new composition, a rubbery, polymeric, sulfur-vulcanizable, organic plastic substance containing unsaturated carbon-to-carbon bonds, having incorporated therein a derivative of a liquid polymer of a conjugated diene containing from 4 to 6 carbon atoms per molecule, said polymer having a viscosity within the range 100 to 6000 Saybolt Furol Seconds at 100° F. and an unsaturation within the range 0.7 to 0.9 double bond per diene unit, said derivative being a hydroxylated product of said polymer containing at least two hydroxyl groups per molecule attached to adjacent carbon atoms and having at saponification number in the range 0 to 150 and the hydroxyl number in the range 100 to 400.

References Cited in the file of this patent

UNITED STATES PATENTS

| | | |
|---|---|---|
| 1,963,108 | Werntz | June 19, 1934 |
| 2,403,200 | Weiss et al. | July 2, 1946 |
| 2,404,766 | Hanson et al. | July 23, 1946 |
| 2,446,811 | Crawford | Aug. 10, 1948 |